(12) United States Patent
Wang et al.

(10) Patent No.: US 11,567,822 B2
(45) Date of Patent: Jan. 31, 2023

(54) METHOD OF MONITORING CLOSED SYSTEM, APPARATUS THEREOF AND MONITORING DEVICE

(71) Applicant: BOE TECHNOLOGY GROUP CO., LTD., Beijing (CN)

(72) Inventors: Xiaohong Wang, Beijing (CN); Hui Rao, Beijing (CN); Kejun Hu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 289 days.

(21) Appl. No.: 16/640,036

(22) PCT Filed: Aug. 21, 2019

(86) PCT No.: PCT/CN2019/101748
§ 371 (c)(1),
(2) Date: Feb. 18, 2020

(87) PCT Pub. No.: WO2020/042979
PCT Pub. Date: Mar. 5, 2020

(65) Prior Publication Data
US 2021/0133013 A1    May 6, 2021

(30) Foreign Application Priority Data
Aug. 30, 2018  (CN) .......................... 201811001210.7

(51) Int. Cl.
*G06F 11/07*    (2006.01)
*G06F 11/30*    (2006.01)
(Continued)

(52) U.S. Cl.
CPC ........ *G06F 11/079* (2013.01); *G06F 11/0769* (2013.01); *G06F 11/30* (2013.01);
(Continued)

(58) Field of Classification Search
CPC ...... G06F 16/951; G06F 16/955; G06F 11/30; G06F 16/952; G06F 11/302
See application file for complete search history.

(56) References Cited

U.S. PATENT DOCUMENTS 8,234,369 B2 * 7/2012 Jones .................. G06F 11/3476
709/224
8,683,016 B1 * 3/2014 Schwartz ............... H04L 43/50
709/220
(Continued)

FOREIGN PATENT DOCUMENTS

CN    102546771 A     7/2012
CN    107241242 A    10/2017
(Continued)

OTHER PUBLICATIONS

International Search Report of PCT/CN2019/101748 and English translation, dated Nov. 7, 2019, 13 pages.

*Primary Examiner* — Jonathan D Gibson
(74) *Attorney, Agent, or Firm* — Muncy, Geissler, Olds & Lowe, P.C.

(57) ABSTRACT

A method of monitoring a closed system, an apparatus thereof and a monitoring device are provided. The method of monitoring the closed system includes: performing a page capturing on a web page of the closed system; searching from a captured page, according to configuration information of data to be monitored of the closed system, a text content corresponding to the data to be monitored; and converting the text content corresponding to the data to be monitored into monitored data which a system monitoring platform is capable of recognizing, and storing the monitored data.

12 Claims, 3 Drawing Sheets

(51) Int. Cl.
   *G06F 16/955*  (2019.01)
   *G06F 16/951*  (2019.01)
(52) U.S. Cl.
   CPC .......... *G06F 11/302* (2013.01); *G06F 16/951* (2019.01); *G06F 16/955* (2019.01)

(56) References Cited

U.S. PATENT DOCUMENTS

| | | | |
|---|---|---|---|
| 2009/0119268 A1* | 5/2009 | Bandaru | G06F 40/258 707/E17.015 |
| 2011/0314091 A1* | 12/2011 | Podjarny | H04L 43/04 709/203 |
| 2012/0226920 A1* | 9/2012 | Strumpf | G06F 11/1443 710/305 |
| 2013/0055268 A1* | 2/2013 | Amershi | G06F 11/3438 718/101 |
| 2013/0060757 A1* | 3/2013 | Myslinski | G06Q 10/10 707/E17.082 |
| 2016/0055490 A1* | 2/2016 | Keren | G06F 16/954 705/14.47 |
| 2019/0095478 A1* | 3/2019 | Tankersley | G06F 11/30 |
| 2019/0121989 A1* | 4/2019 | Mousseau | H04L 67/10 |

FOREIGN PATENT DOCUMENTS

| | | |
|---|---|---|
| CN | 110020263 A | 7/2019 |
| WO | WO-2013026362 A1 | 2/2013 |

* cited by examiner

METHOD OF MONITORING CLOSED SYSTEM, APPARATUS THEREOF AND MONITORING DEVICE

CROSS-REFERENCE TO RELATED APPLICATIONS

This application is the U.S. national phase of PCT Application PCT/CN2019/101748 filed on Aug. 21, 2019, which claims a priority to Chinese Patent Application No. 201811001210.7 filed on Aug. 30, 2018, the disclosure of which are incorporated in its entirety by reference herein.

TECHNICAL FIELD

The present disclosure relates to the field of system monitoring, in particular to a method of monitoring a closed system, an apparatus thereof and a monitoring device.

BACKGROUND

With the development of the Internet of Things, more and more terminal devices are connected to a network. However, background service functions of some systems are not complete enough yet, and a necessary alarm monitoring service and an open Application Programming Interface (API) system are lacking, resulting in that the external monitoring and alarm systems cannot easily access these closed systems to perform a monitoring alert.

SUMMARY

The technical issue to be solved by the present disclosure is to provide a method of monitoring a closed system, an apparatus thereof and a monitoring device, so as to monitor critical information of the closed system without deeply understanding a data structure and an application architecture of the closed system or changing the closed system in the related art.

To solve the above technical issues, technical solutions are provided in some embodiments of the present disclosure as follows:

In one aspect, the a method of monitoring the closed system is provided, including:
   performing a page capturing on a web page of the closed system;
   searching from a captured page, according to configuration information of data to be monitored of the closed system, a text content corresponding to the data to be monitored; and
   converting the text content corresponding to the data to be monitored into monitored data which a system monitoring platform is capable of recognizing, and storing the monitored data.

Optionally, subsequent to the converting the text content corresponding to the data to be monitored into monitored data which a system monitoring platform is capable of recognizing and storing the monitored data, the method further includes:
   sending the monitored data to the system monitoring platform, to enable the system monitoring platform to perform an alarm in the case that the system monitoring platform determines, according to the monitored data, that the closed system is abnormal.

Optionally, prior to the searching from a captured page, according to configuration information of data to be monitored of the closed system, a text content corresponding to the data to be monitored, the method further includes:
   acquiring the configuration information of the data to be monitored of the closed system.

Optionally, the configuration information includes an information name, a URL and a collection field of the data to be monitored.

Optionally, the performing the page capturing on the web page of the closed system includes:
   performing the page capturing on the web page of the closed system according to a predetermined period, and storing the captured page and an information name corresponding to the captured page.

Optionally, the searching from a captured page, according to configuration information of data to be monitored of the closed system, a text content corresponding to the data to be monitored further includes:
   determining, from the configuration information, a collection field that matches the information name corresponding to the captured page;
   searching from the captured page, according to the determined collection field, the text content corresponding to the data to be monitored.

An apparatus of monitoring a closed system is further provided, including:
   a page capturing circuit, configured to perform a page capture on a web page of the closed system;
   an acquiring circuit, configured to search from a captured page, according to configuration information of data to be monitored of the closed system, a text content corresponding to the data to be monitored; and
   a processing circuit, configured to convert the text content corresponding to the data to be monitored into monitored data which the system monitoring platform is capable of recognizing and store the monitored data.

Optionally, the apparatus further includes:
   a sending circuit, configured to send the monitored data to the system monitoring platform, to enable the system monitoring platform to perform an alarm in the case that the system monitoring platform determines, according to the monitored data, that the closed system is abnormal.

Optionally, the apparatus further includes:
   a configuration information acquiring circuit, configured to acquire the configuration information of the data to be monitored of the closed system.

Optionally, the configuration information includes an information name, a URL and a collection field of the data to be monitored.

Optionally, the page capturing circuit is further configured to perform the page capturing on the web page of the closed system according to a predetermined period, and store the captured page and an information name corresponding to the captured page.

Optionally, the acquiring circuit further includes:
   a matching sub-circuit, configured to determine, from the configuration information, a collection field that matches the information name corresponding to the captured page;
   a searching sub-circuit, configured to search from the captured page, according to the determined collection field, the text content corresponding to the data to be monitored.

A computer readable storage medium storing a computer program is further provided, where the computer program is executed by a processor to perform the method of monitoring the closed system hereinabove.

A monitoring device is further provided, including a memory, a processor and a computer program stored in the memory and executable by the processor, where the computer program is executed by the processor to perform the method of monitoring the closed system hereinabove.

DETAILED DESCRIPTION

In order to make the technical issues, technical solutions, and advantages to be solved by the embodiments of the present disclosure clearer, the following describes in detail with reference to the accompanying drawings and embodiments.

A method of monitoring a closed system, an apparatus thereof and a monitoring device are provided in some embodiments of the present disclosure, so as to monitor critical information of the closed system without deeply understanding a data structure and an application architecture of the closed system or changing the closed system in the related art.

Figure 1:
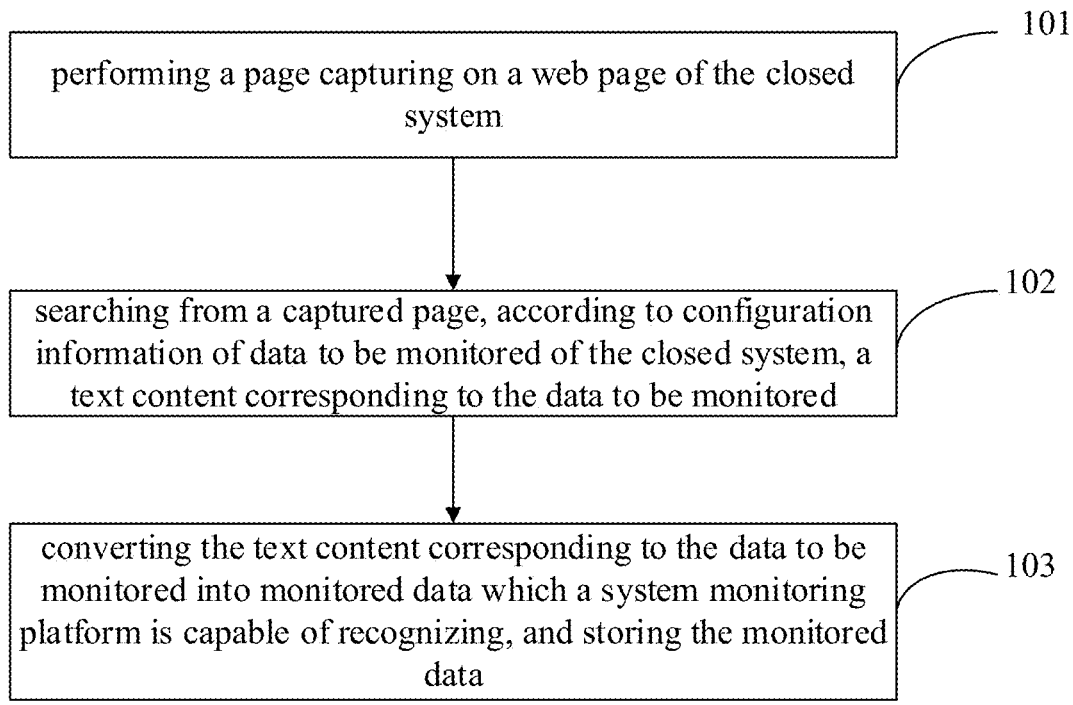
FIG. 1 is a schematic flowchart of a method of monitoring a closed system in some embodiments of the present disclosure.

As shown in FIG. 1, a method of monitoring the closed system is provided in some embodiments of the present disclosure, including:

Step 101: performing a page capturing on a web page of the closed system;

Step 102: searching from a captured page, according to configuration information of data to be monitored of the closed system, a text content corresponding to the data to be monitored;

Step 103: converting the text content corresponding to the data to be monitored into monitored data which a system monitoring platform is capable of recognizing, and storing the monitored data.

In some embodiments of the present disclosure, in the case that the closed system has not developed an API, the web page of the closed system are captured, the text content of the data to be monitored is acquired from the webpage of the closed system, the text content corresponding to the data to be monitored is converted into the monitored data which the system monitoring platform is capable of recognizing, and the monitored data is stored, so that the system monitoring platform can access the monitored data. According to the embodiments of the present disclosure, it is able to monitor critical information of the closed system without deeply understanding a data structure and an application architecture of the closed system or changing the closed system in the related art.

Optionally, subsequent to the converting the text content corresponding to the data to be monitored into monitored data which a system monitoring platform is capable of recognizing and storing the monitored data, the method further includes:

subsequent to the converting the text content corresponding to the data to be monitored into monitored data which a system monitoring platform is capable of recognizing and storing the monitored data, the method further includes: to enable the user to know in time that the closed system is abnormal and take a corresponding action.

Optionally, prior to the searching from a captured page, according to configuration information of data to be monitored of the closed system, a text content corresponding to the data to be monitored, the method further includes:

acquiring the configuration information of the data to be monitored of the closed system. Specifically, the configuration information may include an information name, a URL and a collection field of the data to be monitored. Of course, the configuration information is not limited to the information name, the URL and the collection field of the data to be monitored, and may also include other information which can configure the data to be monitored.

In some embodiments of the present disclosure, first, the configuration information of the data to be monitored in the closed system needs to be obtained, and then a text content corresponding to the data to be monitored is searched from a captured page according to configuration information of data to be monitored of the closed system.

In some embodiments of the present disclosure, the performing the page capturing on the web page of the closed system includes:

performing the page capturing on the web page of the closed system according to a predetermined period, and storing the captured page and an information name corresponding to the captured page.

In some embodiments of the present disclosure, the text content corresponding to the data to be monitored may be searched from the captured page. The searching from a captured page, according to configuration information of data to be monitored of the closed system, a text content corresponding to the data to be monitored further includes:

determining, from the configuration information, a collection field that matches the information name corresponding to the captured page;

searching from the captured page, according to the determined collection field, the text content corresponding to the data to be monitored.

Figure 2:
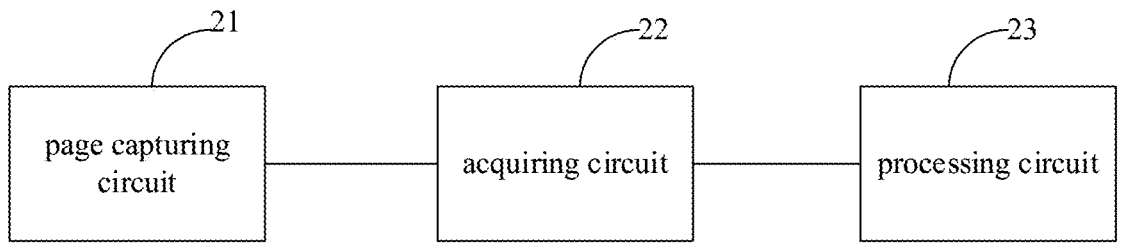
FIG. 2 is a structural block view of an apparatus of monitoring a closed system in some embodiments of the present disclosure.

As shown in FIG. 2, an apparatus of monitoring the closed system is provided in some embodiments of the present disclosure, including:

a page capturing circuit 21, configured to perform a page capture on a web page of the closed system;

an acquiring circuit 22, configured to search from a captured page, according to configuration information of data to be monitored of the closed system, a text content corresponding to the data to be monitored;

a processing circuit 23, configured to convert the text content corresponding to the data to be monitored into monitored data which the system monitoring platform is capable of recognizing and store the monitored data.

In some embodiments of the present disclosure, the monitoring apparatus can be a mobile phone, a tablet personal computer, a laptop computer, a personal digital assistant (PDA), a mobile Internet device (MID) or a wearable device and so on.

In some embodiments of the present disclosure, in the case that the closed system has not developed an API, the web page of the closed system are captured, the text content of the data to be monitored is acquired from the webpage of the closed system, the text content corresponding to the data to be monitored is converted into the monitored data which the system monitoring platform is capable of recognizing, and the monitored data is stored, so that the system monitoring platform can access the monitored data. According to the embodiments of the present disclosure, it is able to monitor critical information of the closed system without deeply understanding a data structure and an application architecture of the closed system or changing the closed system in the related art.

Optionally, the apparatus further includes:
- a sending circuit, configured to send the monitored data to the system monitoring platform, to enable the system monitoring platform to perform an alarm in the case that the system monitoring platform determines, according to the monitored data, that the closed system is abnormal, to enable the user to know in time that the closed system is abnormal and take the corresponding action.

Optionally, the apparatus of monitoring the closed system further includes:
- a configuration information acquiring circuit, configured to acquire the configuration information of the data to be monitored of the closed system. Specifically, the configuration information may include the information name, the URL and the collection field of the data to be monitored.

In some embodiments of the present disclosure, first, the configuration information of the data to be monitored in the closed system needs to be obtained, and then the text content corresponding to the data to be monitored is searched from the captured page according to the configuration information of the data to be monitored in the closed system.

In some embodiments of the present disclosure, the page capturing circuit 21 is specifically configured to perform the page capturing on the web page of the closed system according to a predetermined period, and store the captured page and the information name corresponding to the captured page.

In some embodiments of the present disclosure, the text content corresponding to the data to be monitored may be searched from the captured page. The acquiring circuit 22 includes:
- a matching sub-circuit, configured to determine, from the configuration information, a collection field that matches the information name corresponding to the captured page;
- a searching sub-circuit, configured to search from the captured page, according to the determined collection field, the text content corresponding to the data to be monitored.

The technical solutions for monitoring in the closed system in the present disclosure is further described below with reference to the drawings and specific embodiments.

With the development of the Internet of Things, more and more terminal devices are connected to a network. However, background service functions of some systems are not complete enough yet, and a necessary alarm monitoring service and an open API system are lacking, resulting in that the external monitoring and alarm systems cannot easily access these closed systems to perform a monitoring alert. According to the method of monitoring a closed system, an apparatus thereof and a monitoring device, it is able to monitor critical information of the closed system without deeply understanding a data structure and an application architecture of the closed system or changing the closed system in the related art.

Because the closed system does not have the open API, a monitoring platforms in related art, such as Zabbix, Nagios, etc., cannot obtain the data to be monitored by means of simply writing a script. The technical solution of the present disclosure designs the apparatus of monitoring the closed system, and deploys the apparatus of monitoring the closed system on a server of the closed system to be monitored. The information to be monitored is obtained from the web page of the closed system, and the information is processed and stored for access by the system monitoring platform, so that the system monitoring platform can process according to a certain monitoring strategy to perform a corresponding alarm, so as to monitor critical information of the closed system without deeply understanding a data structure and an application architecture of the closed system or changing the closed system in the related art.

The application scenario of the technical solutions of some embodiments of the present disclosure includes three parts: the closed system, a monitored server and the system monitoring platform.

(1) Closed System

The closed system in some embodiments of the present disclosure is a system that cannot obtain the data to be monitored (such as whether some devices are online, whether some operations have failed, etc.) by accessing data sources and calling APIs and so on. The closed system can run on the monitored server or run on any other monitored server in an environment that the network is reachable.

(2) System Monitoring Platform

The system monitoring platform refers to the common system monitoring platform such as Zabbix, Nagios, Openfalcon, which can monitor various equipment, host networks and application status. In the case that a system status or a service status of the closed system is abnormal, an operation and maintenance personnel is notified to process by email, SMS, WeChat, etc.

(3) Monitored Server

In some embodiments of the present disclosure, the apparatus of monitoring the closed system may be deployed in any one or more monitored servers. The apparatus of monitoring the closed system can provide following services: a configuration management service, a page capturing service, a page analysis service and a data management service. Specific functions of each service are described as followed.

① Configuration Management Service

Figure 3:
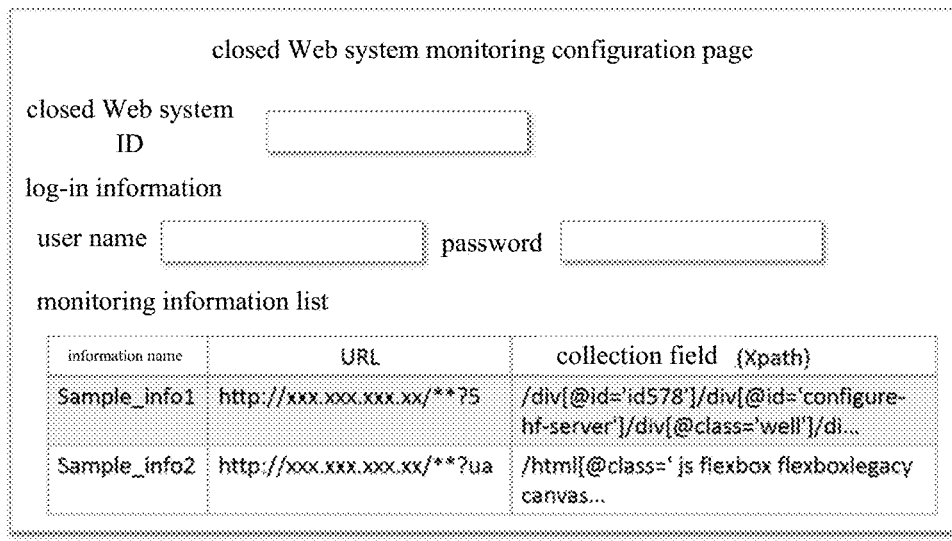
FIG. 3 is a schematic view of a closed Web system monitoring configuration page in some embodiments of the present disclosure.

This service can provide a configuration page for the data to be monitored in the closed system as shown in FIG. 3. Taking the closed system as a closed Web system as an example, a content of the configuration page mainly includes: a unique identification (ID) of the closed Web system, a login information for logging in the closed Web system and a monitoring information list. The login information for logging in the closed Web system includes a username and a password, and a page of the closed Web system can only be accessed after logging in the closed Web system. The monitoring information list, i.e. the configuration information of the data to be monitored, is composed of three parts: the information name, the URL, and the collection field (Xpath) of the data to be monitored.

Figure 4:
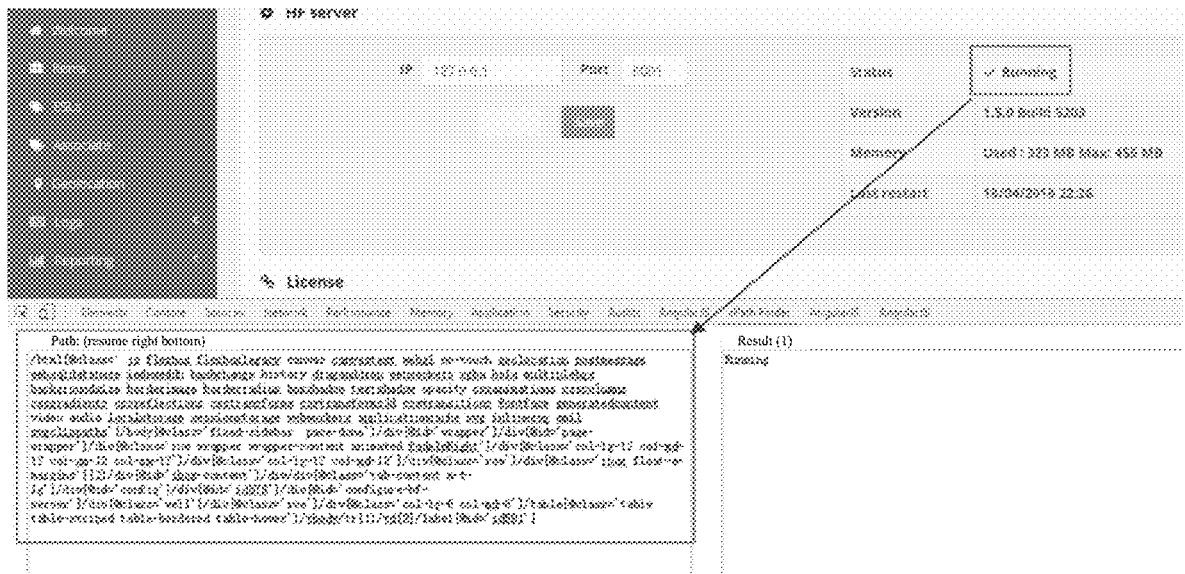
FIG. 4 is a schematic view of acquired collection fields in some embodiments of the present disclosure.

As shown in FIG. 4, a Running in an upper right corner box is the data to be monitored, and the Xpath corresponding to the data to be monitored is in a lower left corner box.

② Page Capturing Service

The page capturing service detects a monitoring information queue. The monitoring information queue includes a plurality of monitoring information lists. In the case that the monitoring information queue is not empty, the page capturing service is triggered. Every predetermined time, a web page content of the closed Web system corresponding to the monitoring information list in the monitoring information queue is sequentially downloaded, and the downloaded web page content and the information name constitute an information index and the information index are added to a page analysis queue.

③ Page Analysis Service

The page analysis service processes the information index in the page analysis queue, matches the corresponding Xpath in the monitoring information list according to the information name in the information index, and searches the text content corresponding to the data to be monitored from the downloaded web page content according to Xpath.

④ Data Management Service

By means of a memory database and so on, the data management service stores the text content corresponding to the data to be monitored through a key-value database so as to be read by a system monitoring platform Agent. The system monitoring platform processes the captured monitored data according to a predetermined monitoring strategy. For example, if the text content corresponding to the captured data to be monitored is Running, it means that the monitoring item is running normally, and there is no need to set the alarm, otherwise an alarm will be performed.

Figure 5:
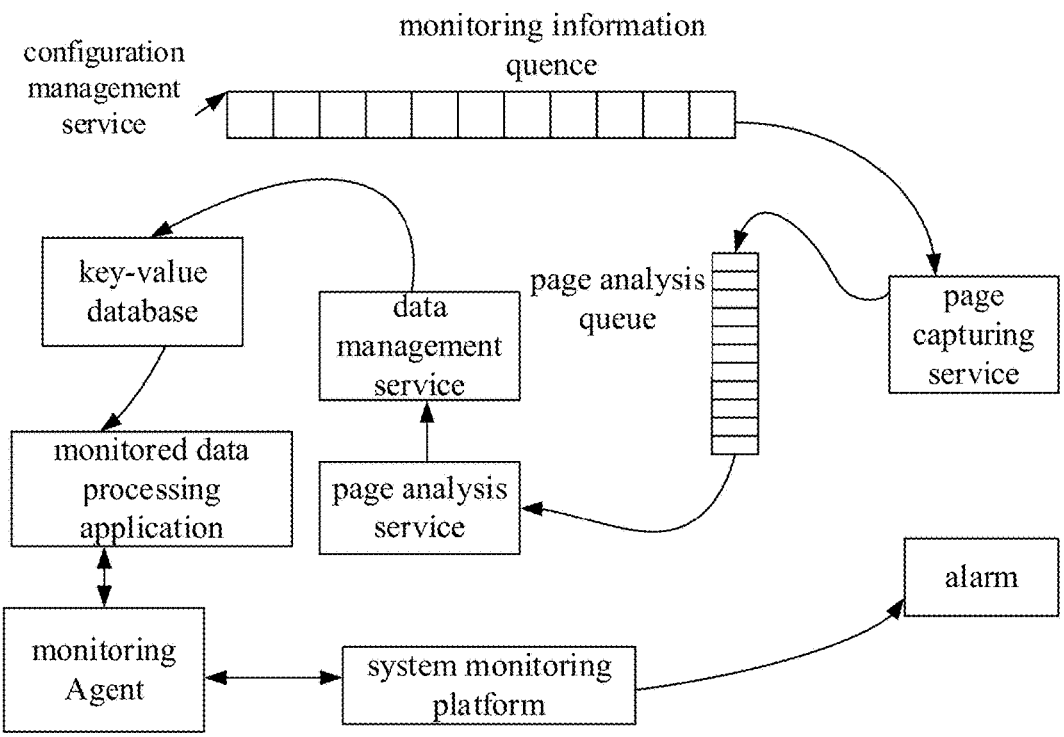
FIG. 5 is a schematic flowchart of a method of monitoring a closed system in some embodiments of the present disclosure.

A process of the method of monitoring the closed system in some embodiments of the present disclosure is specifically shown in FIG. 5 and includes following steps.

The user (such as the operation and maintenance personnel) adds the monitoring information list to the monitoring information queue by establishing the monitoring information list through the configuration management service. The monitoring information list is the configuration information of the data to be monitored, and consists of three parts: the information name, the URL and the collection fields of the data to be monitored. The page capturing service detects the monitoring information queue. In the case that the monitoring information queue is not empty, the page capturing service is triggered, the page of the closed web system is captured according to the URL in the monitoring information list, and the information index constituted by the downloaded web content and the information name form is added into the page analysis queue. The page analysis service processes the information index in the page analysis queue, matches the corresponding Xpath in the monitoring information list according to the information name in the information index, and search the text content corresponding to the data to be monitored from the downloaded web content according to the Xpath. The data management service converts the text content corresponding to the data to be monitored into monitored data that can be recognized by the system monitoring platform, and stores the monitored data in the Key-Value database. The system monitoring platform captures the monitored data from the Key-Value database through a monitoring Agent and a monitored data processing application, and processes the scraped monitored data according to the predetermined monitoring strategy. For example, if the text content corresponding to the scraped data to be monitored is Running, it means that the monitoring item is running normally, and there is no need to set the alarm, otherwise an alarm will be performed.

A monitoring device is provided in some embodiments of the present disclosure, including a memory, a processor and a computer program stored in the memory and executable by the processor, where the computer program is executed by the processor to perform the method of monitoring the closed system hereinabove.

In some embodiments of the present disclosure, the processor is specifically configured to perform the following steps:

performing the page capturing on the web page of the closed system;

searching from a captured page, according to configuration information of data to be monitored of the closed system, a text content corresponding to the data to be monitored;

converting the text content corresponding to the data to be monitored into monitored data which the system monitoring platform is capable of recognizing, and storing the monitored data.

For example, the processor may analyze text data in the captured page stored in the memory according to the configuration information of the data to be monitored in the closed system, and search the text content corresponding to the data to be monitored from the captured page.

In some embodiments of the present disclosure, the processor is specifically configured to perform the following steps:

sending the monitored data to the system monitoring platform, to enable the system monitoring platform to perform an alarm in the case that the system monitoring platform determines, according to the monitored data, that the closed system is abnormal.

In some embodiments of the present disclosure, the processor is specifically configured to perform the following steps:

acquiring the configuration information of the data to be monitored of the closed system, where the configuration information includes the information name, the URL and the collection field of the data to be monitored.

In some embodiments of the present disclosure, the processor is specifically configured to perform the following steps:

performing the page capturing on the web page of the closed system according to a predetermined period, and storing the captured page and an information name corresponding to the captured page.

In some embodiments of the present disclosure, the processor is specifically configured to perform the following steps:

determining, from the configuration information, a collection field that matches the information name corresponding to the captured page;

searching from the captured page, according to the determined collection field, the text content corresponding to the data to be monitored.

Figure 6:
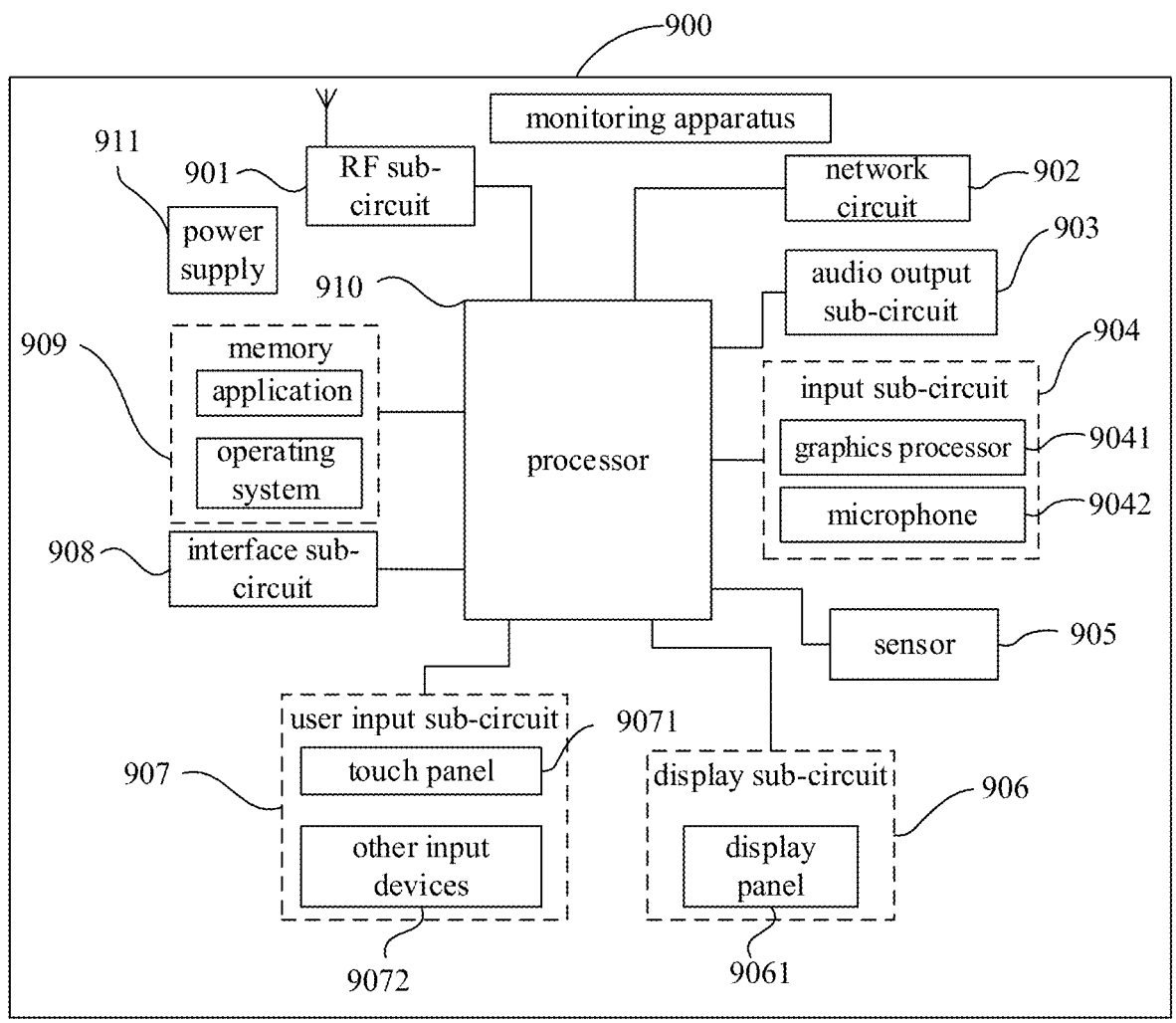
FIG. 6 is a schematic view of a hardware structure of an apparatus of monitoring a closed system in some embodiments of the present disclosure.

Specifically, FIG. 6 is a structure schematic view of a hardware structure of the apparatus of monitoring the closed system in some embodiments of the present disclosure. The monitoring apparatus 900 includes, but is not limited to, components such as a radio frequency sub-circuit 901, a network circuit 902, an audio output sub-circuit 903, an input sub-circuit 904, a sensor 905, a display sub-circuit 906, a user input sub-circuit 907, an interface sub-circuit 908, the memory 909, the processor 910 and power supply 911 and so on. Those skilled in the art should understand that the structure of the monitoring apparatus shown in FIG. 6 does not constitute a limitation on the monitoring apparatus; the monitoring apparatus may include more or fewer components than those shown in the Figure, or may combine some components, or include different arrangements of the components. In some embodiments of the present disclosure, the monitoring apparatus may include, but are not limited to, a mobile phone, a tablet computer, a notebook computer, a palmtop computer, a car terminal and a wearable device.

The processor 910 is configured to capture the web page of the closed system, search from a captured page, according to configuration information of data to be monitored of the closed system, a text content corresponding to the data to be monitored, and convert the text content corresponding to the data to be monitored into monitored data which the system monitoring platform is capable of recognizing and store the monitored data.

Optionally, the processor 910 is further configured to send the monitored data to the system monitoring platform, to enable the system monitoring platform to perform an alarm in the case that the system monitoring platform determines, according to the monitored data, that the closed system is abnormal.

Optionally, the processor 910 is further configured to acquire the configuration information of the data to be monitored of the closed system, where the configuration information includes an information name, a URL and a collection field of the data to be monitored.

Optionally, the processor 910 is further configured to perform the page capturing on the web page of the closed system according to a predetermined period, and store the captured page and an information name corresponding to the captured page.

Optionally, the processor 910 is further configured to determine, from the configuration information, a collection field that matches the information name corresponding to the captured page and search from the captured page, according to the determined collection field, the text content corresponding to the data to be monitored.

In some embodiments of the present disclosure, it should be understood that the radio frequency sub-circuit 901 may be used for receiving and sending signals during a process of transmitting and receiving information or calling. Specifically, after receiving a downlink data from a base station, the downlink data is processed by the processor 910. In addition, an uplink data is sent to the base station. Generally, the radio frequency sub-circuit 901 includes, but is not limited to, an antenna, at least one amplifier, a transceiver, a coupler, a low noise amplifier, a duplexer, and the like. In addition, the radio frequency sub-circuit 901 can also communicate with the network and other devices through a wireless communication system.

The monitoring apparatus 900 provides the user with a wireless broadband Internet access through the network circuit 902, such as helping the user to send and receive an e-mail, browsing the web page, and access a stream media.

The audio output sub-circuit 903 may convert audio data received by the radio frequency sub-circuit 901 or the network circuit 902, or stored in the memory 909 into an audio signal and output the audio signal as a sound. Moreover, the audio output sub-circuit 903 may also provide audio output related to a specific function performed by the monitoring apparatus 900 (such as, a calling signal reception sound, a message reception sound and so on). The audio output sub-circuit 903 includes a speaker, a buzzer, a receiver, and the like.

The input sub-circuit 904 is configured to receive the audio signal or a video signal. The input sub-circuit 904 may include a graphics processing unit (GPU) 9041 and a microphone 9042. The graphics processing unit 9041 processes image data of a static picture or a video obtained by an image capturing apparatus (such as a camera) in a video capturing mode or an image capturing mode. An image frame processed by the graphics processing unit 9041 may be stored in the memory 909 (or other storage medium) or sent via the radio frequency sub-circuit 901 or the network circuit 902. The microphone 9042 can receive sound, and can process such sound into the audio data. The processed audio data can be converted into a format that can be sent to a mobile communication base station via the radio frequency sub-circuit 901 to output in the case of a telephone calling mode.

The monitoring apparatus 900 further includes at least one sensor 905, such as a light sensor, a motion sensor, and other sensors. Specifically, the light sensor includes an ambient light sensor and a proximity sensor. The ambient light sensor can adjust a brightness of a display panel 9061 according to a brightness of ambient light. The proximity sensor can turn off the display panel 9061 and/or backlight in the case that the monitoring apparatus 900 is moved to an ear. As a type of motion sensor, an accelerometer sensor can detect a magnitude of acceleration in various directions (usually three axes), can detect a magnitude and direction of gravity when the accelerometer sensor is stationary, can be used to identify an attitude of a terminal (such as horizontal and vertical screen switching, related game, magnetometer attitude calibration), can vibrate to identify related functions (such as pedometer, tap), and so on. The sensor 905 may further include a fingerprint sensor, a pressure sensor, an iris sensor, a molecular sensor, a gyroscope, a barometer, a hygrometer, a thermometer, an infrared sensor, and so on, and details are not described herein again.

The display sub-circuit 906 is configured to display an information inputted by the user or an information provided to the user. The display sub-circuit 906 may include the display panel 9061. The display panel 9061 may be configured in a form of a liquid crystal display (LCD), an organic light-emitting diode (OLED) and the like.

The user input sub-circuit 907 may be configured to receive an inputted number or a character information, and generate a key signal input related to a user setting and a function control of the terminal. Specifically, the user input sub-circuit 907 includes a touch panel 9071 and other input devices 9072. The touch panel 9071, also known as a touch screen, can collect a touch operation of the user on or near the touch panel (such as an operation that the user uses a finger, a stylus and so on, or any suitable object or accessory on the touch panel 9071 or near the touch panel 9071). The touch panel 9071 may include two parts: a touch detection apparatus and a touch controller. The touch detection apparatus detects a touch position of the user, detects a signal caused by the touch operation, and transmit the signal to a touch controller. The touch controller receives a touch information from the touch detection apparatus, converts the touch information into a contact coordinate, and transmits the contact coordinate to the processor 910, and receives a command from the processor 910 and executes the command. In addition, various types such as resistive, capacitive, infrared and surface acoustic wave can be used to implement the touch panel 9071. In addition, the touch panel 9071 may be implemented in various types such as a resistance-type, a capacitance-type, an infrared-type and a surface acoustic wave type. Besides the input device 9072, the user input sub-circuit 907 may further include other input devices 9072. Specifically, other input devices 9072 may include, but are not limited to, a physical keyboard, a function key (such as a volume control key, a switch key, etc.), a trackball, a mouse and an operating stick, and details are not described herein again.

Further, the touch panel 9071 may cover on the display panel 9061. In the case that the touch panel 9071 detects the touch operation on or near the touch panel 9071, the touch panel 9071 transmits the touch operation to the processor 910 to determine a type of a touch event. Then, the processor 910 provides a corresponding visual output on the display panel 9061 according to the type of the touch event. Although in FIG. 6, the touch panel 9071 and the display panel 9061 are implemented as two independent components to implement an input function and an output function of the monitoring apparatus, in some embodiments, the touch panel 9071 and the display panel 9061 can be integrated to realize the input function and the output function of the monitoring apparatus, and details are not described herein again.

The interface sub-circuit 908 is an interface for connecting an external apparatus with the monitoring apparatus 900. For example, the external apparatus may include a wired or wireless headphones port, an external power (or battery charger) port, a wired or wireless data port, a memory card port, a port for connecting an apparatus with an identification circuit, an audio input/output (I/O) port, a video I/O port, an earphone port and so on. The interface sub-circuit 908 may be configured to receive input (e.g., data information, power, etc.) from the external apparatus and transmit the received input to one or more elements within the monitoring apparatus 900 or may be configured to transmit the data between the monitoring apparatus 900 and the external apparatus.

The memory 909 may be configured to store a software program and various data. The memory 909 may mainly include a storing program region and a storing data region. The storing program region can store an operating system, at least one application program required by a function (such as a sound playback function, an image playback function, etc.) and the like; the storing data region can store data (such as audio data, phone book, etc.) created according to the use of the mobile phone. In addition, the memory 909 may include a high-speed random access memory, and may further include a non-volatile memory, such as at least one magnetic disk storage device, a flash memory device, or other volatile solid-state storage device.

The processor 910 is a control center of the monitoring apparatus, uses various interfaces and lines to connect various parts of the entire monitoring apparatus, executes various functions of the monitoring apparatus and processes data by means of running or executing a software program stored in the memory 909 and/or circuits and calling data stored in the memory 909, thereby performing overall monitoring of the monitoring apparatus. The processor 910 may include one or more processing sub-circuits. Optionally, the processor 910 may integrate an application processor and a modem processor. The application processor mainly deals with the operating system, a user interface and the application program, etc. The modem processor mainly deals with a wireless communication. It can be understood that the modem processor may not be integrated into the processor 910.

The monitoring apparatus 900 may further include the power supply 911 (such as a battery) for supplying power to various components. Optionally, the power supply 911 can be logically connected to the processor 910 through a power management system, so that functions such as a managing charging, a managing discharging, and a power consumption management can be implemented through the power management system.

In addition, the monitoring apparatus 900 includes some functional circuits that are not shown, and details are not described herein again.

In the present disclosure, it should be noted that the terms "including", "comprising", or any other variant thereof are intended to encompass a non-exclusive inclusion, so that processes, methods, commodities or equipment that include a set of elements include not only those elements, but also other elements which are not explicitly listed, or further include the elements that are inherent to such processes, methods, commodities or equipment. In the case of no more limitations, an element defined by the phrase "comprising a . . . " does not exclude the case that there are another identical elements in the process, the method, the article or the device which includes the above elements.

According to the description of the above embodiments, those skilled in the art can clearly understand that the methods in the above embodiments can be implemented by means of a software plus a necessary universal hardware platform, and of course, also can be implemented by hardware, but in many cases the former is a better implementation. Based on such an understanding, the technical solution of the present disclosure in essence or to a part that contributes to related technologies may be embodied in a form of a software product. The computer software product is stored in the storage medium (such as ROM/RAM, magnetic disk, CD-ROM), and includes a plurality of instructions so that the terminal (such as a mobile phone, a computer, a server, an air conditioner or network device, etc.) executes the method described in some embodiments of the present disclosure.

A computer readable storage medium is also provided in some embodiments of the present disclosure, in which the computer program is stored, the computer program is executed by the processor to perform the method of monitoring the closed system described above.

The computer readable storage medium includes a permanent and non-persistent, removable and non-removable media, and an information storage can be achieved by any method or technology. An information can be a computer readable instruction, the data structure, a circuit of program or other data. Examples of computer storage media include, but are not limited to, a phase change memory (PRAM), a static random access memory (SRAM), a dynamic random access memory (DRAM), other types of random access memory (RAM), and a read-only memory (ROM), an electrically erasable programmable read-only memory (EEPROM), a flash memory or other memory technologies, a read-only disc read-only memory (CD-ROM), a digital versatile disc (DVD) or other optical storage, a magnetic tape cartridge, a magnetic tape storage or other magnetic storage devices or any other non-transmitting media which may be used to store information that can be accessed by a computing device. As defined herein, the computer readable storage medium does not include transitory media, such as a modulated data signal and a carrier.

In some embodiments of the present disclosure, numbers of the steps cannot be used to define a sequence of the steps. For those skilled in the art, a sequential change of the steps is also within the scope of the present disclosure without an inventive labor.

The above embodiments are merely some embodiments of the present disclosure. It should be noted that numerous improvements and modifications may be made by those skilled in the art without departing from the principle of the present disclosure, and these improvements and modifications shall also fall within the scope of the present disclosure.

What is claimed is:

1. A method of monitoring a closed system, performed by an apparatus of monitoring a closed system, wherein the apparatus comprises page capturing circuit, an acquiring circuit and a processing circuit, wherein the method comprises:
 performing, by the page capturing circuit, a page capturing on a web page of the closed system;
 searching, by the acquiring circuit, from a captured page, according to configuration information of data to be monitored of the closed system, a text content corresponding to the data to be monitored; and
 converting, by the processing circuit, the text content corresponding to the data to be monitored into monitored data which a system monitoring platform is capable of recognizing, and storing the monitored data,
 wherein the apparatus further comprises a configuration information acquiring circuit,
 wherein prior to the searching from a captured page, according to configuration information of data to be monitored of the closed system, a text content corresponding to the data to be monitored, the method further comprises acquiring, by the configuration information acquiring circuit, the configuration information of the data to be monitored of the closed system,
 wherein the configuration information comprises an information name and a collection field of the data to be monitored, and
 wherein the performing by the page capturing circuit the page capturing on the web page of the closed system comprises detecting, by the page capturing circuit, a monitoring information queue comprising a plurality of monitoring information lists, and triggering the page capturing in the case that the monitoring information queue is not empty.

2. The method of monitoring the closed system according to claim 1, wherein the apparatus further comprises a sending circuit;
 subsequent to the converting the text content corresponding to the data to be monitored into monitored data which a system monitoring platform is capable of recognizing and storing the monitored data, the method further comprises:
 sending, by the sending circuit, the monitored data to the system monitoring platform, to enable the system monitoring platform to perform an alarm in the case that the system monitoring platform determines, according to the monitored data, that the closed system is abnormal.

3. The method of monitoring the closed system according to claim 1, wherein the performing the page capturing on the web page of the closed system comprises:
 performing, by the page capturing circuit, the page capturing on the web page of the closed system according to a predetermined period, and storing the captured page and an information name corresponding to the captured page.

4. The method of monitoring the closed system according to claim 3, wherein the apparatus further comprises a matching sub-circuit and a searching sub-circuit, and
 wherein the searching from a captured page, according to configuration information of data to be monitored of the closed system, a text content corresponding to the data to be monitored further comprises:
 determining, by the matching sub-circuit, from the configuration information, a collection field that matches the information name corresponding to the captured page; and
 searching, by the searching sub-circuit, from the captured page, according to the determined collection field, the text content corresponding to the data to be monitored.

5. An apparatus of monitoring a closed system, comprising: a memory, a processor and a computer program stored in the memory and executable by the processor, wherein the computer program is executed by the processor to:
 perform a page capturing on a web page of the closed system;
 search from a captured page, according to configuration information of data to be monitored of the closed system, a text content corresponding to the data to be monitored; and
 convert the text content corresponding to the data to be monitored into monitored data which the system monitoring platform is capable of recognizing and store the monitored data;
 wherein the computer program is executed by the processor to:
 acquire the configuration information of the data to be monitored of the closed system;
 wherein the configuration information comprises an information name and a collection field of the data to be monitored; and
 wherein the computer program is executed by the processor to detect a monitoring information queue comprising a plurality of monitoring information lists, and trigger the page capturing in the case that the monitoring information queue is not empty.

6. The apparatus of monitoring the closed system according to claim 5, wherein the computer program is executed by the processor to:
 send the monitored data to the system monitoring platform, to enable the system monitoring platform to perform an alarm in the case that the system monitoring platform determines, according to the monitored data, that the closed system is abnormal.

7. The apparatus of monitoring the closed system according to claim 5, wherein the computer program is executed by the processor to:
 perform the page capturing on the web page of the closed system according to a predetermined period, and store the captured page and an information name corresponding to the captured page.

8. The apparatus of monitoring the closed system according to claim 7, wherein the computer program is executed by the processor to:
 determine, from the configuration information, a collection field that matches the information name corresponding to the captured page;
 search from the captured page, according to the determined collection field, the text content corresponding to the data to be monitored.

9. An apparatus of monitoring a closed system, comprising:
 a page capturing circuit, configured to perform a page capturing on a web page of the closed system;
 an acquiring circuit, configured to search from a captured page, according to configuration information of data to be monitored of the closed system, a text content corresponding to the data to be monitored;

a processing circuit, configured to convert the text content corresponding to the data to be monitored into monitored data which the system monitoring platform is capable of recognizing and store the monitored data; and a configuration information acquiring circuit configured to, prior to searching from the captured page, according to the configuration information of the data to be monitored of the closed system, the text content corresponding to the data to be monitored, acquire the configuration information of the data to be monitored of the closed system, wherein the configuration information comprises an information name and a collection field of the data to be monitored, and wherein the page capturing circuit is further configured to detect a monitoring information queue comprising a plurality of monitoring information lists, and trigger the page capturing in the case that the monitoring information queue is not empty.

10. The apparatus of monitoring the closed system according to claim 9, further comprising a sending circuit, configured to send the monitored data to the system monitoring platform, to enable the system monitoring platform to perform an alarm in the case that the system monitoring platform determines, according to the monitored data, that the closed system is abnormal.

11. The apparatus of monitoring the closed system according to claim 9, wherein the page capturing circuit is further configured to perform the page capturing on the web page of the closed system according to a predetermined period, and store the captured page and an information name corresponding to the captured page.

12. The apparatus of monitoring the closed system according to claim 11, wherein the acquiring circuit further comprises:

a matching sub-circuit, configured to determine, from the configuration information, a collection field that matches the information name corresponding to the captured page; and a searching sub-circuit, configured to search from the captured page, according to the determined collection field, the text content corresponding to the data to be monitored.

* * * * *